D. W. GITCHELL.
HAT.
No. 192,065.
Patented June 19, 1877.
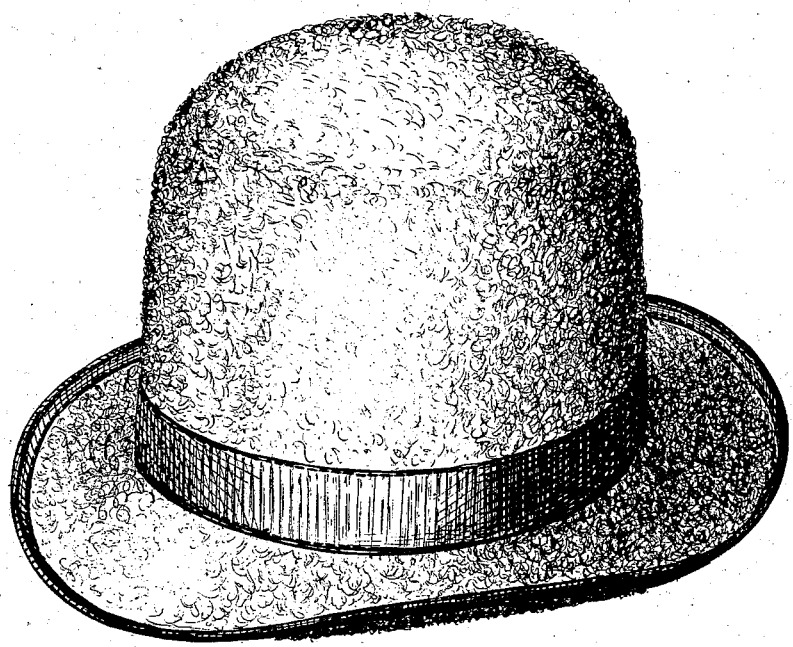
Witnesses
John Becker
Fred. T. Hayner
Inventor,
D. W. Gitchell
by his Attorneys
Brown & Allen

UNITED STATES PATENT OFFICE

DELOS W. GITCHELL, OF ORANGE, NEW JERSEY.

IMPROVEMENT IN HATS.

Specification forming part of Letters Patent No. 192,065, dated June 19, 1877; application filed November 28, 1876.

*To all whom it may concern:*

Be it known that I, DELOS W. GITCHELL, of Orange, in the county of Essex and State of New Jersey, have invented a new and useful Improvement in Wool Felt Hats; and I do hereby declare that the following is a full, clear, and exact description of the same, reference being had to the accompanying drawing, which forms part of this specification, and which represents a side view of a wool felt hat constructed in accordance with my improvement.

This invention consists in a wool felt hat, having a napped and curled surface, the same constituting a new article of manufacture.

Said improved hat differs from other wool felt hats by having its nap raised and curled instead of being pumiced down smooth. To make the hat, a bat is first produced, in the usual way, on a cone from wool delivered to the cone from a carding-engine, or in any other suitable manner, and this bat is hardened and pulled, as heretofore, in the manufacture of wool felt hats. The hat-body thus produced then has a nap raised upon it by putting it on a cone-block in a lathe, or on a rotary spindle, subjecting its surface to the action of teasles. This may be done by means of teasles secured in suitable stocks, which are held in the hand of a workman and moved over the hat-body in a direction lengthwise of the cone while the latter rotates. After this the surface of the body is sheared to give the raised nap a uniform length. Said shearing may be done by means of a shearing-machine, which is the subject of a separate application made by me for Letters Patent; or the nap may be sheared by any suitable means. The hat is next blocked in the usual way, to give it the required shape, after which the nap, which is of uniform length, is curled to give the required finish to the surface. The curling is done by placing the hat on a block of the required shape to fit it, and rubbing the surface with a suitable rubber held in or placed on the hand of a workman and moved over the surface in small circles. This rubber may be in the form of a sheath, made to fit the hand, and faced with india-rubber.

The operations of napping, shearing, and curling are performed all over the exterior of the crown and band of the hat, and on both the upper and under surfaces of the brim, the napping and shearing of the under face of the brim being performed on the rotary cone while the body is turned inside out. The napping and shearing and curling may be performed while the body is in a dry state, or slightly dampened by steaming.

In some cases the hat-body may be embossed in the way commonly practiced in embossing felt hats, the embossing being done before the operations of shearing and curling.

These hats, having a curled surface, may be made either soft or stiff. When made stiff, the stiffening is done by soaking the body in a solution of shellac, in the usual way, after shearing and previous to curling.

I claim—

A wool felt hat having a napped and curled surface, substantially as herein described.

DELOS W. GITCHELL.

Witnesses:
MICHAEL RYAN,
HENRY T. BROWN.